Figure 13:
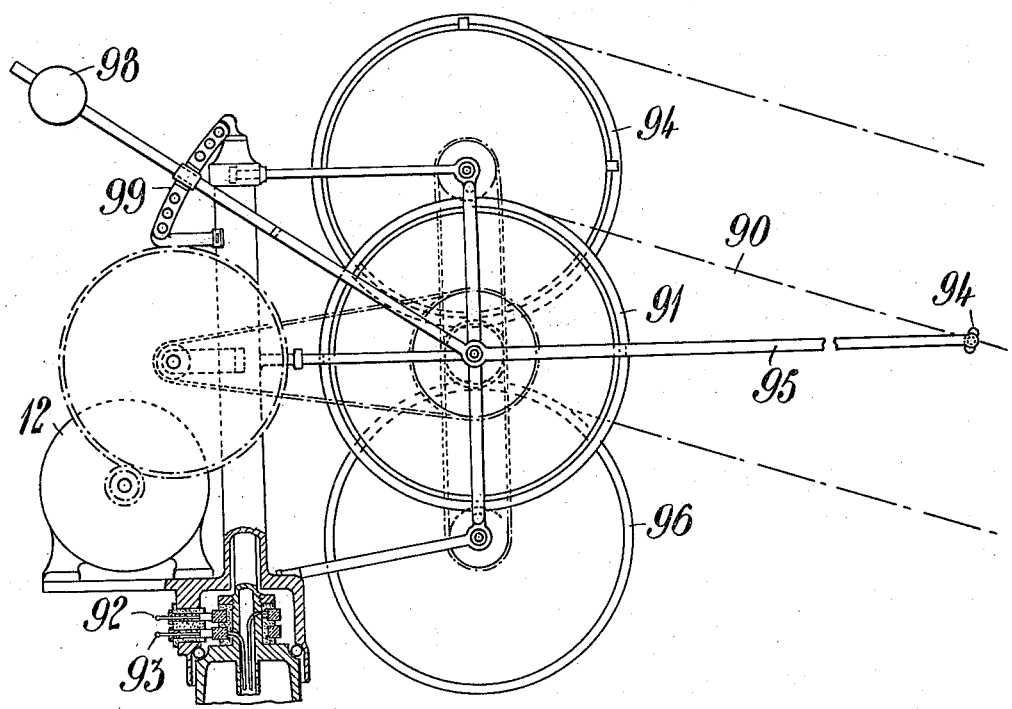

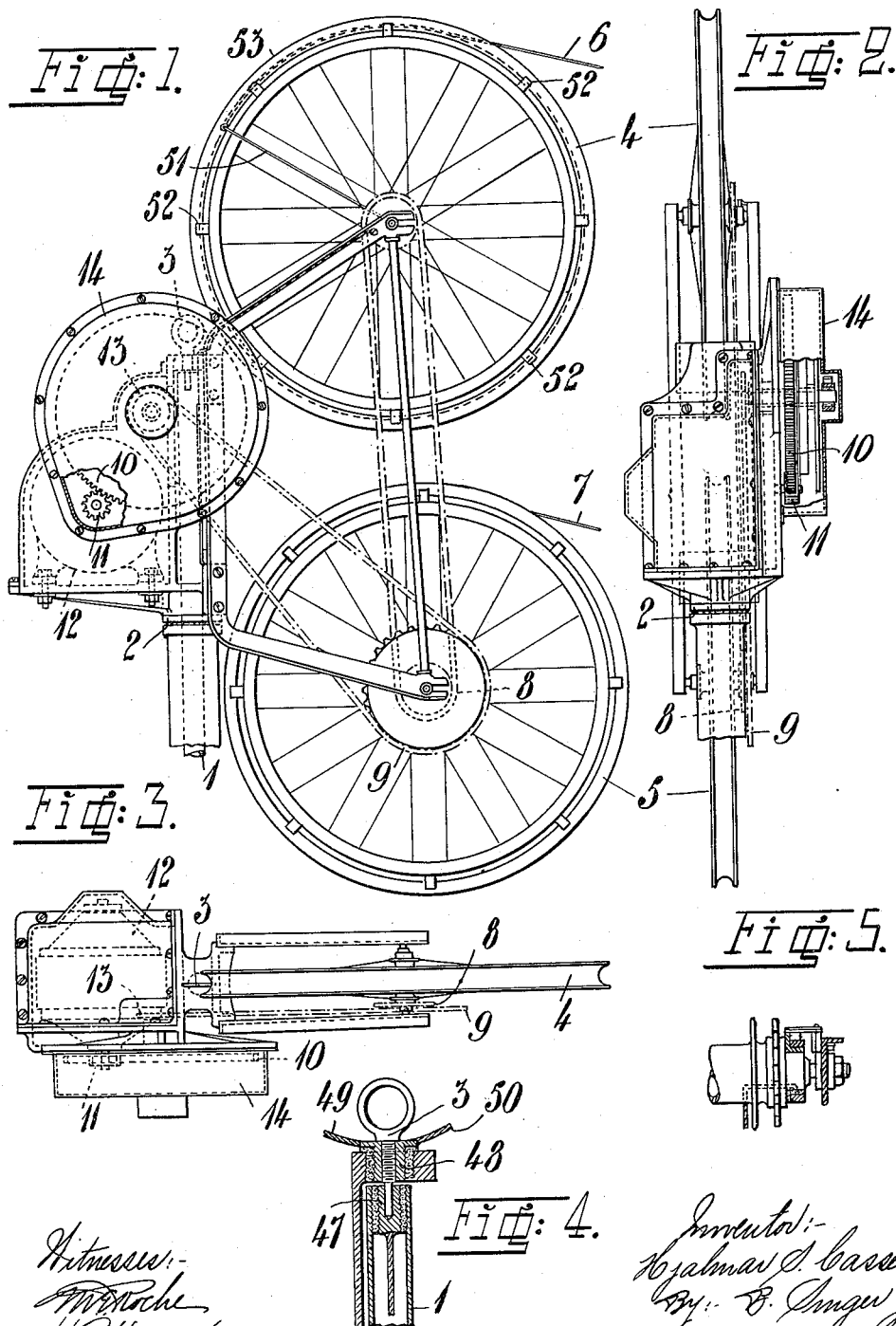

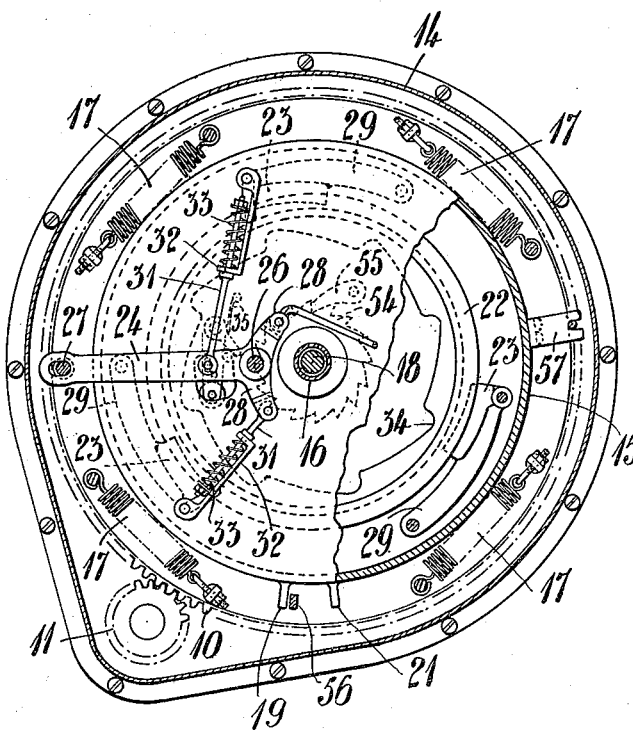
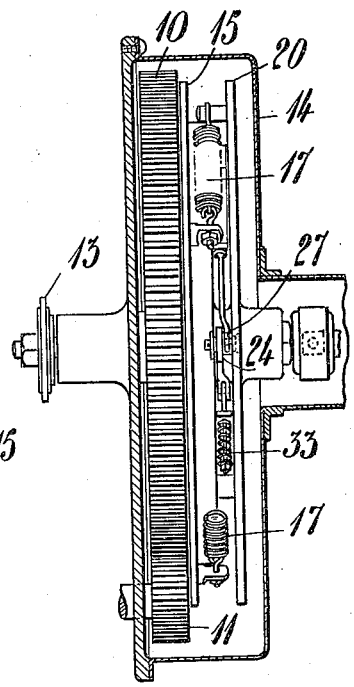
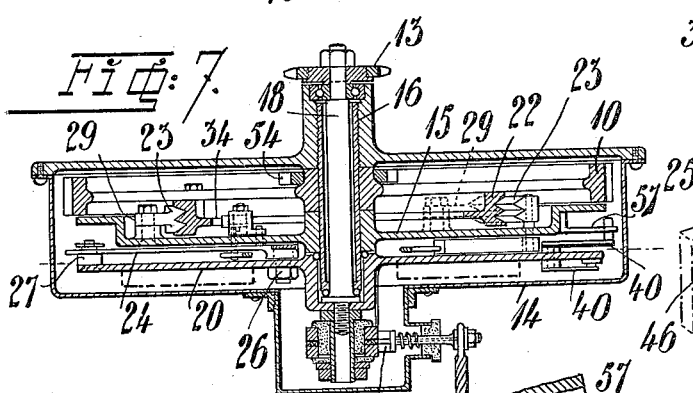
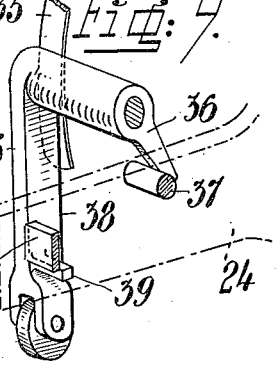

H. S. CASSEL.
ELECTRICAL WIRE REGULATING APPARATUS.
APPLICATION FILED MAR. 19, 1915.
1,164,920.
Patented Dec. 21, 1915.
4 SHEETS—SHEET 3.
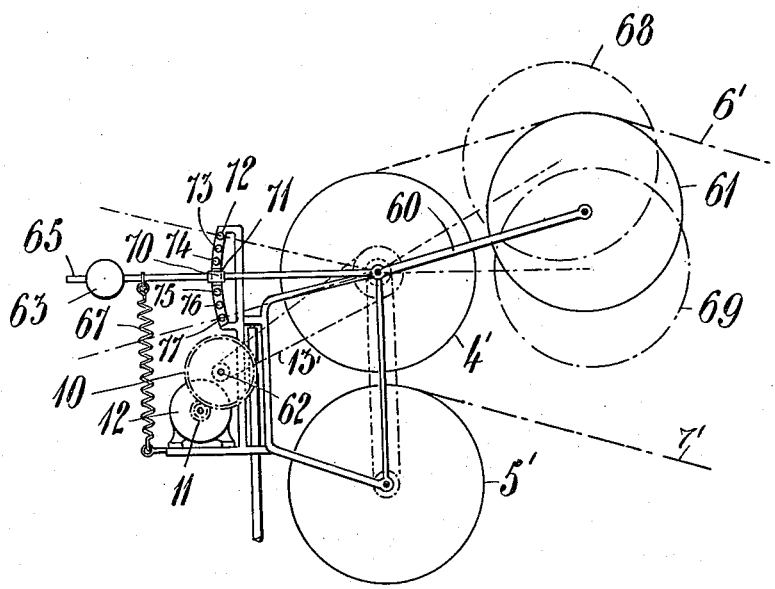
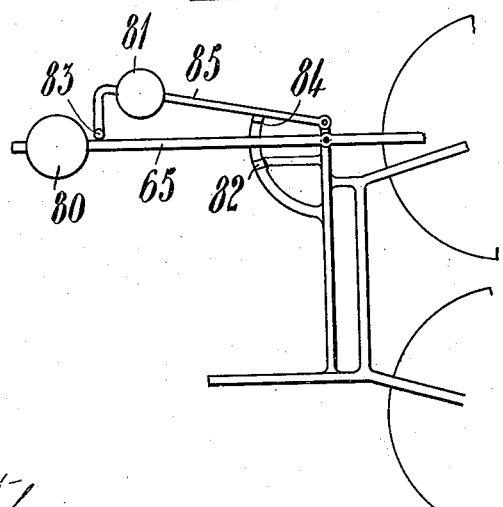

H. S. CASSEL.
ELECTRICAL WIRE REGULATING APPARATUS.
APPLICATION FILED MAR. 19, 1915.

1,164,920.

Patented Dec. 21, 1915.
4 SHEETS—SHEET 4.

UNITED STATES PATENT OFFICE.

HJALMAR SIGFRID CASSEL, OF STOCKHOLM, SWEDEN.

ELECTRICAL-WIRE-REGULATING APPARATUS.

1,164,920. Specification of Letters Patent. Patented Dec. 21, 1915.

Application filed March 19, 1915. Serial No. 15,658.

*To all whom it may concern:*

Be it known that I, HJALMAR SIGFRID CASSEL, a subject of the King of Sweden, and resident of Östermalmsgatan 28, Stockholm, Sweden, have invented certain new and useful Improvements in Electrical-Wire-Regulating Apparatus, and do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In electric transmission of power to agricultural machines movable on the field the attempts that have been made to transmit the power from the fixed line of wires or the power station direct to the agricultural machine by means of an insulated cable laid on the ground have proved to be attended by great drawbacks. Thus, for instance, if the cable drags or is too much bent defects in the insulation may easily arise.

Having the foregoing difficulties in mind, the principal object of my invention is to provide an apparatus which shall be free from such defects, but which shall also be convenient to use and not too high in cost.

A further object of my invention resides in the particular arrangement and combination of parts hereinafter described.

In carrying out my invention I have, moreover, devised an apparatus the general features of which will now be pointed out, such general description being followed by a detailed description referring to the accompanying drawing.

By transmitting the power to the agricultural machine by means of an aerial line which can be suspended between a mast or pole arranged on the said machine and an another mast or pole which may be erected on the ground, or arranged on a movable carriage which by means of one or more cables laid on the ground communicates with the source of supply, great advantages are attained, such as increased liberty of movement for the agricultural machine, increased security against defects in insulation, and so forth. Upon moving the agricultural machine, the aerial line, preferably consisting of uninsulated wires, should be now shortened, now lengthened, which in accordance with the present invention takes place automatically by means of a wire regulating apparatus arranged on the top of one of the two masts, which apparatus, as required, pays out or feeds in the said wires by unwinding from, or winding up on one or more drums, reels or wheels. The winding up takes place by means of an electric motor coupled to the said reel and supplied with current from the line of wire, which motor is started automatically when the line has reached the fixed limit for the minimum allowable tension or the maximum allowable sag or slackness, either at the maximum allowable distance between the points of suspension, or for a given distance fixed at the time. The unwinding, on the other hand, takes place automatically when the line has reached its maximum allowable tension or its minimum allowable sag, either absolutely or for the distance given at the time between the points of suspension. In order to obviate a too rapid unwinding, an automatically acting brake device may be arranged. The automatic devices are regulated by a regulator, which, when the regulation is dependent on the tension, consists of one or more springs or weights which carry the stress of the free line of wires, or, when the regulation takes place solely owing to the varying height of the wire, consists of a movable arm, which follows the upward and downward movements of the wire. The control of the drum upon which the wire is wound may be entirely electrical in which case the governor or regulator acts on a rheostat or the like which may entirely control the motion of the motor, or partly control the motor electrically by starting it in one direction or stopping it and partly by mechanical means. Likewise the braking may take place partly electrically and partly mechanically. By this system there can be transmitted either three-phase alternating current, when three wires are employed in the line, or uniphase alternating current or direct current, when two wires are employed.

A description follows here of three different forms for a two-wire system, and of the modifications required for three-phase alternating current.

Figure 14:
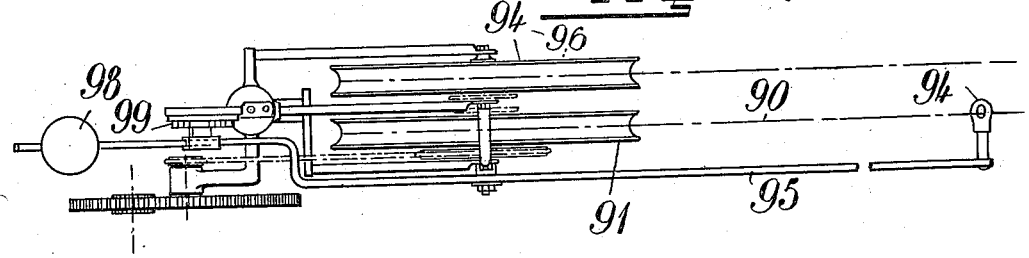

Figs. 1-8 exhibit a form with a spring regulator and a mechanical brake device. Fig. 1 shows the wire take-up device mounted upon a mast seen from the side, Fig. 2 from the rear (the opposite side to the one facing the agricultural machine part being broken away); Fig. 3 viewed from above; Fig. 4 illustrates a detail of the transmission of the current from the mast top to the apparatus; Fig. 5 an insulated drag contact for the transmission of the current from the upper winding up wheel to the upper wire. Figs. 6, 7 and 8 show details of the regulating mechanism. Fig. 9 illustrates a detail of the ratchet device on a larger scale. Fig. 10 exhibits a detail on a larger scale of the relay and its manipulation. Figs. 11 and 12 illustrate a form in which the regulation takes place by a spring or weight balancing the free line of wire by a lever device. Figs. 13 and 14 show a form in which the regulation takes place by a freely movable arm which follows the free line of wire.

The wire regulating apparatus turns freely around a tube (1) inserted in the mast-top and rests on a disk (2) turning around the said tube on ball bearings, and is held secured in its position by an insulated pin (3) which is screwed into the upper end of the tube. On the apparatus there are two winding wheels (4 and 5), one for each of the two wires of the direct current line, of which the upper one (6) is insulated, the lower one (7), connected with the earth. The lower wheel (5) is by means of a chain drive (8) directly coupled to the upper one (4) which runs at the same speed; the wheel (5) is further by means of a chain drive (9) and a toothed gearing (10—11) coupled to the motor (12) in such a manner that the line is wound up at a definite maximum speed when the motor runs at its highest (normal) speed. The large toothed wheel (10) rotates co-axially with the chain rim (13) which drives the winding-up wheel, but both, however, rotate on separate shafts. A temporary coupling of these wheels (10 and 13) takes place when the line is being wound up. Coupling or uncoupling takes place automatically by the regulating mechanism, which is surrounded by a water-tight mantle (14) and is constructed in the following manner: The large toothed wheel (10), which meshes with the wheel (11) on the motor, rotates on a fixed sleeve (16), and on the same fixed sleeve rotates a wheel (15) which by means of several (coöperating) spiral springs (17) is connected with a wheel or disk (20) mounted on the shaft (18) of the chain rim in such a manner that the springs are continually more or less tightened and allow of a certain displacement between the said wheels (15, 20) which displacement is limited by two stops (19—21), on disk 15, between which stops moves the stop (56) fixed to the disk (20). On the toothed wheel (10) there is mounted a brake disk (22) on which act a number of brakes (23) fixed to arms (29) journaled on the wheel (15), which brakes are manipulated by a lever (24) movable around a pivot (26) placed on the same wheel (15) and operated by a pin (27), contacting with the end of the lever and mounted on the wheel (20). The arms (28) of the lever are connected with the brake arms (29) by means of rods (31—32) slidable on each other and connected by spiral springs (33), which springs act, on the ends of the said rods (31—32) being pressed together, in such a manner that the lever (24), on being turned, yieldingly brakes the brake disk (22).

The coöperating springs (17) may be regarded as a spring balance which exactly indicates the pressure (or weight) exercised by the free line of wire. The maximum allowable line stress corresponds to the maximum tension of the spiral springs (17) within the path bounded by the stops (19—21); the minimum line stress corresponds to the minimum tension of the spring. At the maximum line stress the brakes are entirely opened by the turning of the lever (24) and the wires of the line can run out freely; as soon as, and in the degree that, the stress is thereby diminished, the lever moves back (is turned in), and the brakes are applied, so that the toothed wheel (10) is finally securely connected with the shaft (18) and the chain wheel (13) mounted on it. By way of a further security against slipping, there is a spring pawl (25) the end of which is thrown against the teeth in a ratchet rim (34) by means of a spring (35). The said pawl is provided with an arm (36) which by a pin (37) mounted on the lever (24) lifts up the pawl (25) when the lever has been moved outward to a certain point, so that the wheel (15) runs freely; the arm (38) of the pawl is provided with a stop (39), which stop, on the lever moving back (being turned in), falls on a wing (46), which again lets the pawl (25) fall against the ratchet (34) as soon as the lever has been turned back farther to a certain position.

In order that the motor may not be compelled by the stress of the free line to reverse its motion, there is a ratchet wheel (54) (mounted on the toothed wheel 10) on which acts a pawl (55) journaled on the frame. In order to start the motor on the diminished tension of the springs (17) which carry the line pressure, there is arranged on the disk (20) an ordinary rheostat with a spring contact (40—40) conducted by a double arm, which contact moves from the zero position (41) and over the contacts (42, 43) mounted on the disk 20 and which are coupled in the usual way for resistance to the contact (44), when the motor has its maximum pressure. The contact (40) is moved by a fork (57) mounted on the wheel 15 within certain fixed boundaries. When the springs (17) have attained a certain maximum degree of tension, which, for instance, should correspond to the position of the stop (56) against the stop (19) the drag contact (40) is adjusted at the zero position (41); if the tension pressure is reduced, the contact 40 moves to (42, 43) and finally reaches (44), where the tension stress is lowest (the stop 56 has reached the stop 21).

The electrical arrangement is as follows:—The current is conducted from the source of supply in an insulated wire to the insulated sleeve (47) (see Fig. 4) in which the pin (3) is rotatable, and through the said pin (3) and the insulated screw head (48) to two insulated wires of which one (49) goes to the motor (12), the other 50 to the agricultural machine through the upper wire (6). The circuit to the motor (12) goes through one of two brush contacts (45) of the usual construction arranged on the shaft (18) to the contact (40) of the relay, and one of the contacts (42, 43, 44) back through the second of the said contacts (45) to the motor, and from the latter through the frame, etc., to the earth contact. The other wire (50) goes through the brush contact (see Fig. 5) (of known construction) to the shaft of the upper winding-up wheel (4) and through an insulated rod (51) to the outer wheel tire (53) insulated by blocks of fiber (52) and from the said wheel tire out through the upper free wire (6) to the agricultural machine; from which it is led back through the lower free wire (7) and through a contact arranged on the lower winding-up wheel to the apparatus and the earth contact connected with it.

It will be seen that in the foregoing modification there is no necessity for turning the motor backward, and means are provided to prevent this, since the control of the tension of the conductors is partly mechanical as well as partly electrical. However, in the other two modifications of my apparatus, hereinafter described, the control is entirely electrical and the motors are arranged to drive in both directions.

Fig. 11 shows another form of the said wire compensator. The arrangement of the frame and the winding-up wheels (4', 5') is the same. The upper wheel (4') is by means of a chain drive (13') and a toothed wheel gearing (10—11) coupled to the motor (12); the wheels (10) and sprocket of the drive (13') are mounted on the same shaft (62). On the frame is journaled a movable arm (60), which carries a running wheel (61), over which the upper wire (6') runs. The arm (60) forms with the arm (65) a lever on the one side of which the pressure of the upper free wire (6') acts. In order to balance the greater pressure of the arm (60) with the running wheel, (61) there is mounted on the arm (65) a weight (63). The pressure of the wire (6) is balanced by a spiral spring (67) attached between the arm (65) and the frame; the force of the spring is so adjusted that at a certain minimum tension it balances with the minimum calculated pressure of the wire (6'), at a certain maximum tension the maximum calculated pressure of the same wire, the position of the wheel 61 corresponding to the minimum and maximum tensions of the wire and spring are shown in dotted lines at 68 and 69 respectively.

On the arm (65) is fixed a spring contact (70) which together with the series of contacts (72—77) forms a rheostat (of known construction) for controlling of the motor (12) both for paying out and winding in the wire as well as for electric braking. Fig. 11 shows the contact (70) set at the zero position (71), which in this case lies in the middle of the contact tier and which corresponds to the normal tension of the wire (6'). The motor is so constructed that it is electrically braked in this position. If the tension diminishes, the arm (65) goes downward, the contact (70) is moved successively to the contacts (75, 76, 77), in which last position the motor attains its full speed in one direction and winds in the lines (6' and 7'). If, on the other hand, the tension (6') of the wire increases above the normal tension, the arm (65) goes upward, the contact (70) moves successively to the contacts (74, 73 and 72), when the motor attains its full speed in the other direction pays out the lines 6' and 7'.

A modification of the same form is shown in Fig. 12. The construction of this modification is much the same, but the spring has been replaced by two weights 80 and 81, the former of which is arranged on the arm 65, the latter, 81, being mounted on an arm, 85, journaled on the frame, just above the arm 65. The weight 80 is so adjusted that the arm 65 at the minimum tension of the wire 6', sinks down to a support 82, the line then being drawn in by the motor; if the tension is increased, the arm 65 is raised to the normal position, the zero position of the corresponding rheostat, in which the motor is being braked, this position being shown in Fig. 12. The arm 65 has then been pressed against a shoulder 83 on the arm 85, but is not able to lift the said arm. If the tension is increased still more, the arm 85 is also lifted, the motor reverses, and the line is paid out. The movement of the arm 85 in the upward direction is limited by the stop 84. The arm 65 is thus caused to move between two extreme contacts or stops 82 and 84, which correspond in tension to the stops 19 and 21 on the machine first described.

In Figs. 13 and 14, I have illustrated a form of an apparatus for three-phase alternating current, the rotation of which is controlled by a freely movable arm 95, which follows without resistance the up and down movements of the middle wire 90 according as the wire becomes more or less tight. The wire 90 is wound up on the middle wheel 91 which drives both the upper wheel 94 and the lower wheel 96 by means of a chain drive. The wheel 91 being driven from the motor 12 by means of a double reduction gear, all the three wires are wound up or paid out at the same time. The arm (95), which should be rather long and be provided at the outer extremity with an insulated ring (94) through which the wire (90) runs, is balanced by a weight (98) so that the turning of the arm itself shall not meet with any resistance. The arm carries an elastic contact acting on the fixed contacts of the rheostat (99) arranged in the same manner as in Fig. 11. When the wire (90) sinks so that it forms a certain minimum angle with a perpendicular line drawn from the shaft of the arm, the motor is adjusted for ahead motion and the line is fed in; when on the other hand the wire is raised so that it forms a certain maximum angle, the motor is reversed and the line is paid out, etc.

Two of the electric insulated lines from the source of supply are carried over to the electric supply, which is freely swingable, through two brush contacts (92 and 93). The uninsulated line goes to earth through the upper journal of the apparatus. The two upper wheels (91 and 94) are provided with brush contacts on the shafts and the wheel tires are insulated in the same manner as the wheel (4) in Fig. 1. The bottom wire is connected to earth. The lines on the apparatus to the three-phase motor (12) and the rheostat (99) are fixed and are arranged in the usual way.

Having thus described my invention, I claim—

1. An apparatus for automatically reeling in and paying out aerial wires comprising in combination a plurality of drums to which the wires are connected, for winding up and paying out the same, said wires being of opposite polarity, an electric motor for operating said drums, a rheostat connected to the motor for controlling the current therein, said rheostat having maximum, minimum, and intermediate fixed contacts, a movable contact for said rheostat, and means operating against the tension of the line for holding said movable contact in one or more intermediate positions, each corresponding with one of a number of given positions of the line.

2. An apparatus for automatically reeling in and paying out aerial wires comprising in combination a plurality of drums to which the wires are connected for winding up and paying out the same, said wires being of oppositely polarity, an electric motor for operating said drums, a rheostat connected to the motor for controlling the current therein, said rheostat having maximum, minimum, and intermediate fixed contacts, a movable contact for said rheostat, and means for gradually moving said movable contact in such direction as to increase the current through the rheostat as the aerial line falls; said means being adapted to maintain the movable contacts stationary in a given position when the aerial line is stationary in a given position.

Signed at Stockholm.

In testimony whereof I have signed my name to this specification in the presence of two subscribing witnesses.

HJALMAR SIGFRID CASSEL.

Witnesses:
 FRANK C. LYON,
 JACOB BAGGE.

Copies of this patent may be obtained for five cents each, by addressing the "Commissioner of Patents, Washington, D. C."